United States Patent
Yang et al.

(10) Patent No.: US 10,979,926 B2
(45) Date of Patent: Apr. 13, 2021

(54) METHOD FOR PERFORMING MEASUREMENT FOR CELLS AND A MOBILE COMMUNICATION DEVICE PERFORMING THE METHOD

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/450,074

(22) Filed: Jun. 24, 2019

(65) Prior Publication Data

US 2019/0394663 A1    Dec. 26, 2019

(30) Foreign Application Priority Data

Jun. 25, 2018  (KR) .................. 10-2018-0072528
Apr. 29, 2019  (KR) .................. 10-2019-0050040

(51) Int. Cl.
*H04W 24/10* (2009.01)
*H04B 17/327* (2015.01)
*H04B 7/08* (2006.01)
*H04W 52/02* (2009.01)

(52) U.S. Cl.
CPC .......... *H04W 24/10* (2013.01); *H04B 7/088* (2013.01); *H04B 17/327* (2015.01); *H04W 52/0261* (2013.01)

(58) Field of Classification Search
CPC ................................................ H04W 24/10
See application file for complete search history.

(56) References Cited

U.S. PATENT DOCUMENTS

| | | | |
|---|---|---|---|
| 10,517,061 B1* | 12/2019 | Kumar | H04B 7/088 |
| 2014/0112269 A1* | 4/2014 | Yu | H04L 5/0035 |
| | | | 370/329 |
| 2015/0304868 A1* | 10/2015 | Yu | H04B 7/0617 |
| | | | 370/312 |
| 2017/0311252 A1* | 10/2017 | Takano | H04B 7/0617 |
| 2018/0359790 A1* | 12/2018 | Ingale | H04W 28/16 |
| 2020/0022040 A1* | 1/2020 | Chen | H04W 56/001 |

FOREIGN PATENT DOCUMENTS

| | | | | |
|---|---|---|---|---|
| CN | 106576265 A | * | 4/2017 | ............. H04B 7/063 |
| WO | WO-2017196491 A1 | * | 11/2017 | ............. H04W 24/10 |
| WO | WO-2018062959 A1 | * | 4/2018 | ............. H04B 7/086 |

* cited by examiner

*Primary Examiner* — Deepa Belur
(74) *Attorney, Agent, or Firm* — Lee Hong Degerman Kang Waimey

(57) ABSTRACT

There is provided a method for performing measurement. The method performed by a wireless communication device and comprises: performing first measurement for a SS(Synchronization Signal)/PBCH(Physical Broadcast Channel) Block (SSB) transmitted from a serving cell by using a first number of receiving beams; performing second measurement for a SSB transmitted from a neighboring cell by using a second number of receiving beams; and transmitting first information related to the first measurement and second information related to the second measurement to the serving cell, wherein the second number is different from the first number.

18 Claims, 15 Drawing Sheets

METHOD FOR PERFORMING MEASUREMENT FOR CELLS AND A MOBILE COMMUNICATION DEVICE PERFORMING THE METHOD

CROSS-REFERENCE TO RELATED APPLICATIONS

Pursuant to 35 U.S.C. § 119(a), this application claims the benefit of earlier filing date and right of priority to Korean Patent Application Nos. 10-2018-0072528, filed on Jun. 25, 2018, and 10-2019-0050040, filed on Apr. 29, 2019, the contents of which are all hereby incorporated by reference herein in their entirety.

BACKGROUND OF THE INVENTION

Field of the Invention

The present invention relates to mobile communication.

Discussion of the Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

A user equipment (hereinafter, UE) for NR supports analog beamforming. The UE uses a plurality of Rx beams for performing measurement. If a number of Rx beams increases, more power is used for the measurement. Currently, the UE uses the same number of Rx beams for measurement related to a serving cell and measurement related to a neighboring cell. For saving power, it is needed to use different number of Rx beams for the serving cell and the neighboring cell.

Different number of Rx beams results in different Rx antenna gain. It means results of the measurement related to a serving cell and the measurement related to a neighboring cell can be different even though both measurements were performed in same condition (for example, SNR). For example, if the number of Rx beams for serving cell is higher than number of Rx beam for neighboring cell measured RSRP under same SNR for serving cell and neighboring cell, measured RSRP for serving cell is higher than measured RSRP for neighboring cell. It does not reflect the expected same RSRP. Thus, compensation for the measurements is needed for Network to decide correctly cell changing.

SUMMARY OF THE INVENTION

Accordingly, a disclosure of the present specification has been made in an effort to solve the aforementioned problem.

In accordance with an embodiment of the present invention, provided is a method for performing measurement. The method performed by a wireless communication device and comprising: performing first measurement for a SS(Synchronization Signal)/PBCH(Physical Broadcast Channel) Block (SSB) transmitted from a serving cell by using a first number of receiving beams; performing second measurement for a SSB transmitted from a neighboring cell by using a second number of receiving beams; and transmitting first information related to the first measurement and second information related to the second measurement to the serving cell, wherein the second number is different from the first number.

In accordance with an embodiment of the present invention, provided is a wireless communication device for performing measurement, the wireless communication device comprising: a transceiver; and a processor operatively coupled to the transceiver, the processor is configured to: perform first measurement for a SS(Synchronization Signal)/PBCH(Physical Broadcast Channel) Block (SSB) transmitted from a serving cell by using a first number of receiving beams; perform second measurement for a SSB transmitted from a neighboring cell by using a second number of receiving beams; and control the transceiver to transmit first information related to the first measurement and second information related to the second measurement to the serving cell, wherein the second number is different from the first number.

In accordance with an embodiment of the present invention, provided is a processor for a wireless communication device in a wireless communication system, wherein the processor is configured to control the wireless device to: perform first measurement for a SS(Synchronization Signal)/PBCH(Physical Broadcast Channel) Block (SSB) transmitted from a serving cell by using a first number of receiving beams; perform second measurement for a SSB transmitted from a neighboring cell by using a second number of receiving beams; and transmit first information related to the first measurement and second information related to the second measurement to the serving cell, wherein the second number is different from the first number.

DETAILED DESCRIPTION OF THE EMBODIMENTS

Figure 1:
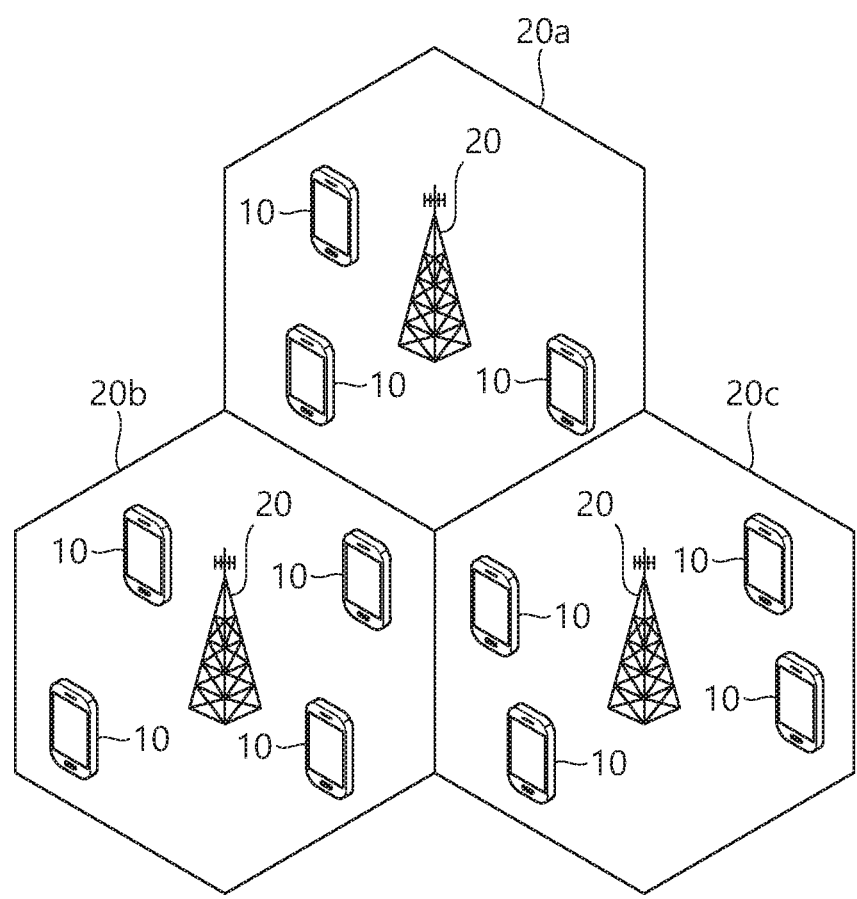
FIG. 1 illustrates a wireless communication system.

Hereinafter, based on 3rd Generation Partnership Project (3GPP) long term evolution (LTE), 3GPP LTE-advanced (LTE-A), 3GPP 5G (5th generation) or 3GPP New Radio (NR), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), gNB (Next generation NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile BroadBand (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 2:
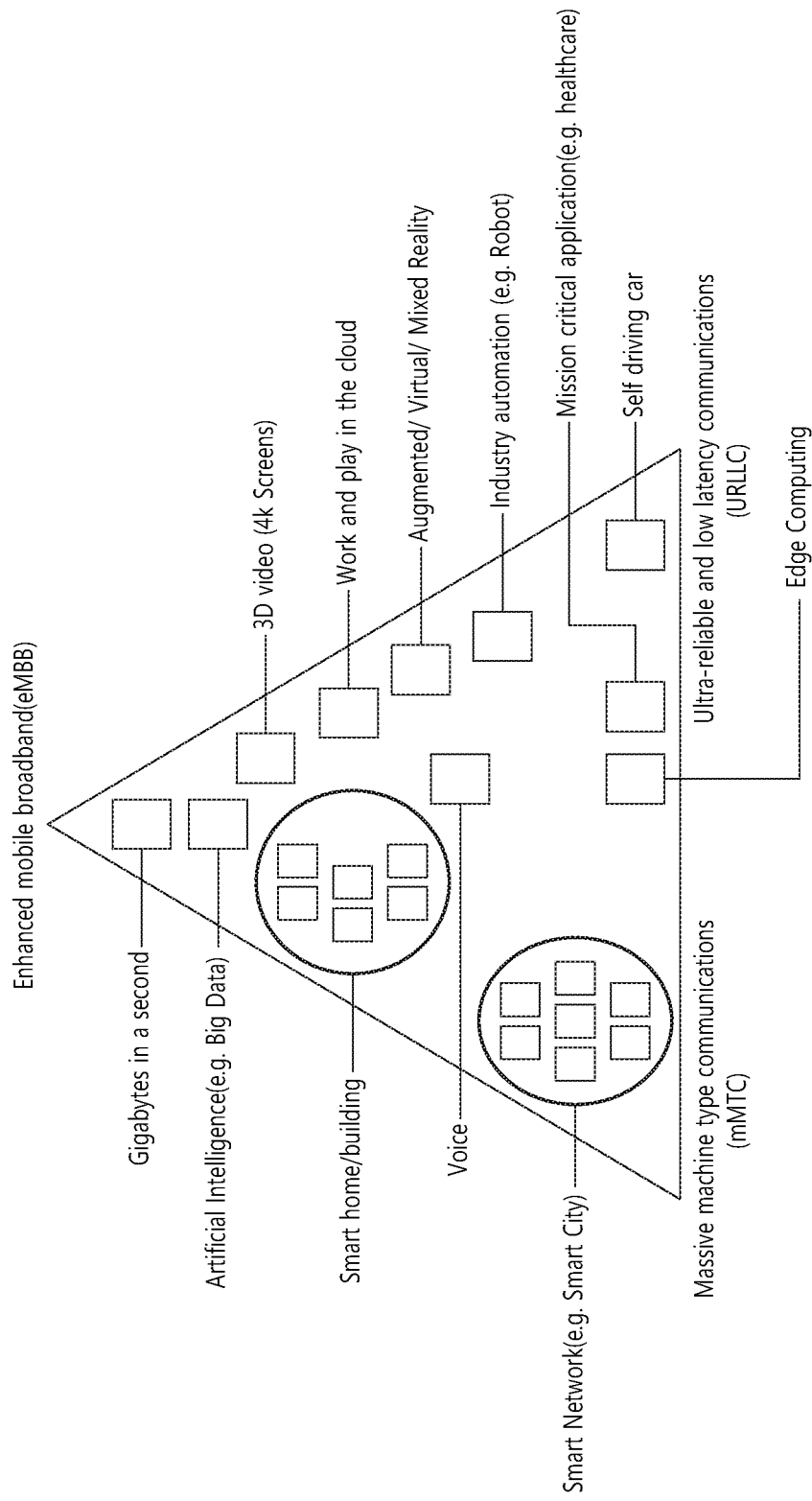
FIG. 2 illustrates examples of 5G usage scenarios to which the technical features of the present invention can be applied.

FIG. 2 Illustrates Examples of 5G Usage Scenarios to which the Technical Features of the Present Invention can be Applied.

The 5G usage scenarios shown in FIG. 2 are only exemplary, and the technical features of the present invention can be applied to other 5G usage scenarios which are not shown in FIG. 2.

Referring to FIG. 2, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 2 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

<Operating Band in NR>

Operating bands in NR are divided into FR 1 (Frequency Range 1) band and FR 2 band. FR 1 band includes a frequency band of 7.125 GHz or less, and FR 2 band includes a frequency band exceeding 7.125 GHz. FR 1 band and FR 2 band are shown in Table 1.

TABLE 1

| Frequency Range | Corresponding range of frequency |
| --- | --- |
| Frequency Range 1 (FR 1) | 410 MHz-7125 MHz |
| Frequency Range 2 (FR 2) | 24250 MHz-52600 MHz |

<SS Block in NR>

In 5G NR, the UE defines a physical block channel (PBCH) including information required to perform an initial access, that is, a master information block (MIB) and a synchronization signal SS (including PSS and SSS). SS block is SS(Synchronization Signal)/PBCH(Physical Broadcast Channel) Block (SSB). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 3:
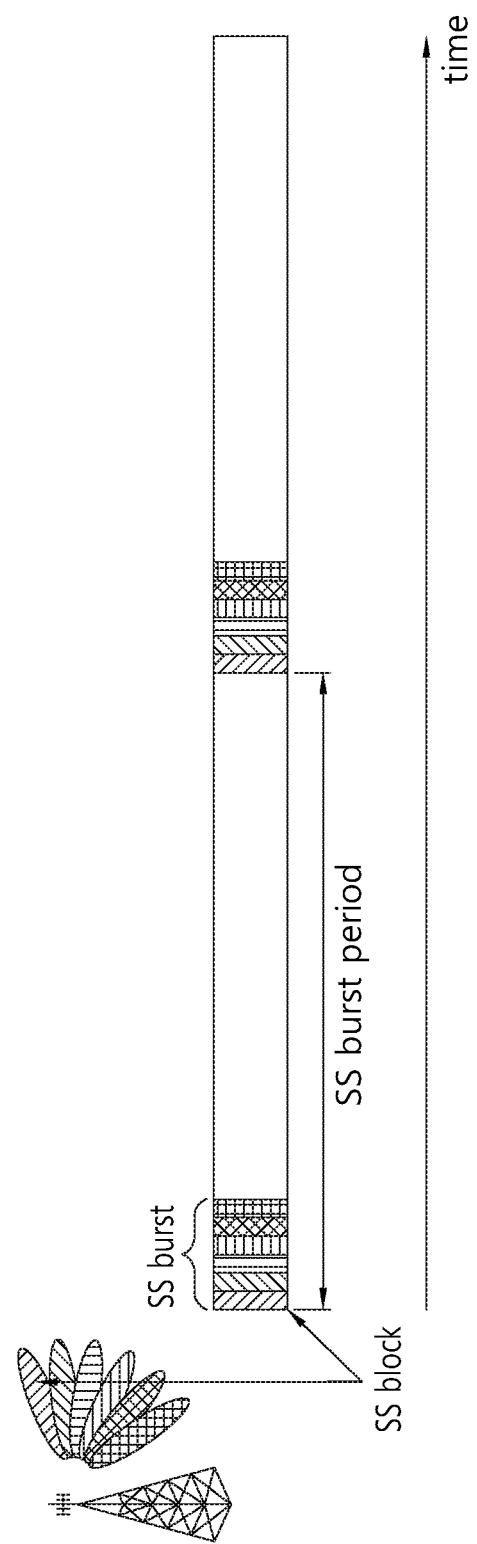
FIG. 3 is an exemplary diagram illustrating an example of an SS block in the NR.

FIG. 3 is an Exemplary Diagram Illustrating an Example of an SS Block in NR.

Referring to FIG. 3, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 4.

Figure 4:
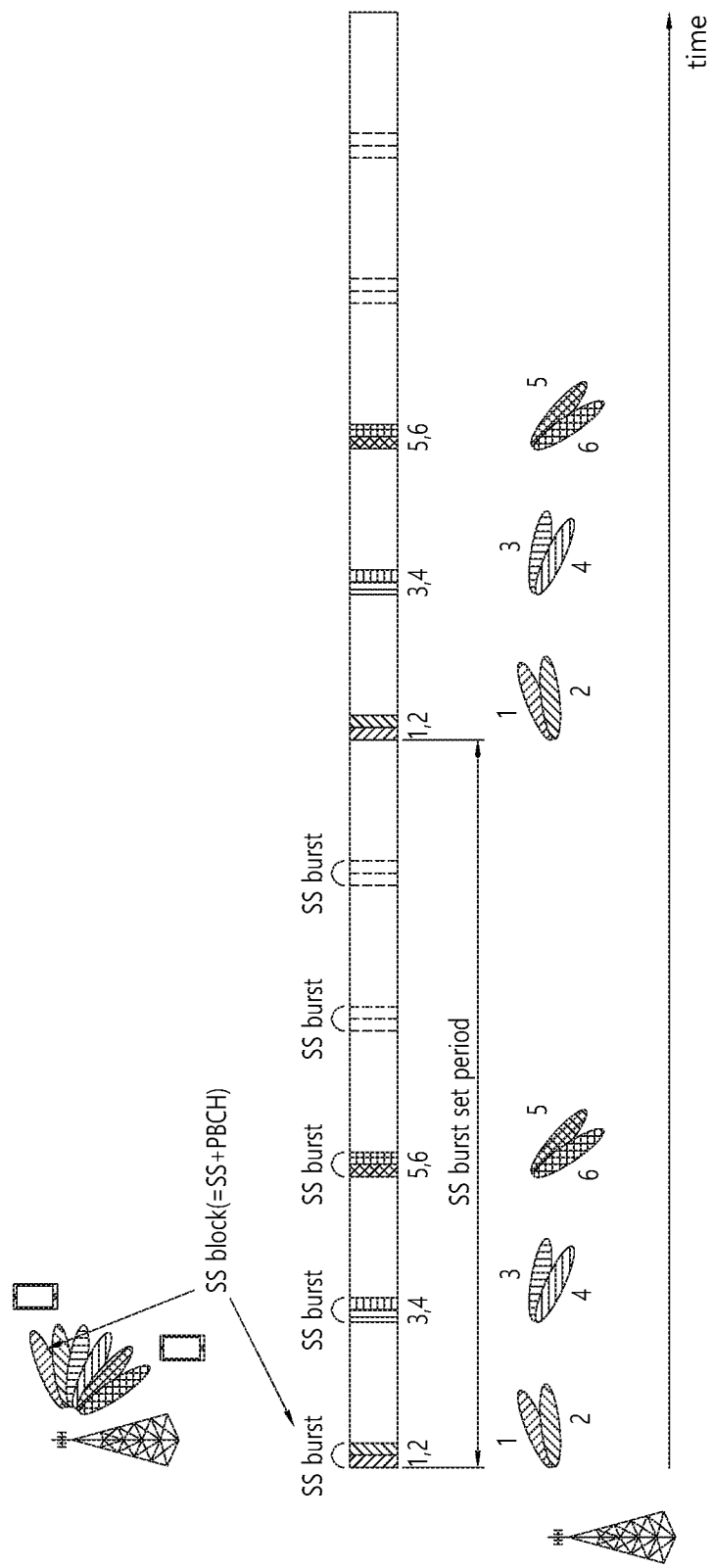
FIG. 4 is an exemplary diagram illustrating an example of beam sweeping in the NR.

FIG. 4 is an Exemplary Diagram Illustrating an Example of Beam Sweeping in NR.

The base station transmits each SS block in the SS burst with beam sweeping over time. At this time, the SS blocks in the SS burst set are transmitted in order to support UEs existing in different directions. In FIG. 4, the SS burst set includes SS blocks 1 to 6, and each SS burst includes two SS blocks.

<RRM Measurement>

The purpose of Radio Resource Management (RRM) measurement is to ensure UE mobility by comparing the measurement result for the serving cell with the measurement result for the neighboring cell. The UE can measure RSRP, RSRQ, or SINR, etc. based on the signal received from the serving cell and the signal received from the neighboring cell, and report the measurement result to the serving cell. Then, the serving cell compares the measurement result of the serving cell with the measurement result of the neighboring cell, determines a procedure (for example, a handover procedure) related to the UE mobility, and performs the procedure to ensure mobility of the UE.

The UE may perform RRM measurement (SSB based RRM measurement) based on the SSB transmitted by the serving cell and the SSB transmitted by the neighboring cell. The UE may perform RRM measurement (CSI-RS based RRM measurement) based on the CSI-RS transmitted by the serving cell and the CSI-RS transmitted by the neighboring cell.

<Synchronization Signal (SS) Reference Signal Received Power (SS-RSRP)>

SS-RSRP is an example of RRM measurement. SS reference signal received power (SS-RSRP) is defined as the linear average over the power contributions (in [W]) of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations, the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals. If SS-RSRP is not used for L1-RSRP, the additional use of CSI reference signals for SS-RSRP determination is not applicable.

SS-RSRP shall be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP is measured only from the indicated set of SS/PBCH block(s).

For frequency range 1, the reference point for the SS-RSRP shall be the antenna connector of the UE. For frequency range 2, SS-RSRP shall be measured based on the combined signal from antenna elements corresponding to a given receiver branch. For frequency range 1 and 2, if receiver diversity is in use by the UE, the reported SS-RSRP value shall not be lower than the corresponding SS-RSRP of any of the individual receiver branches.

<SS Reference Signal Received Quality (SS-RSRQ)>

SS-RSRP is also an example of RRM measurement. Secondary synchronization signal reference signal received quality (SS-RSRQ) is defined as the ratio of NxSS-RSRP/NR carrier RSSI, where N is the number of resource blocks in the NR carrier RSSI measurement bandwidth. The measurements in the numerator and denominator shall be made over the same set of resource blocks.

NR carrier Received Signal Strength Indicator (NR carrier RSSI), comprises the linear average of the total received power (in [W]) observed only in certain OFDM symbols of measurement time resource(s), in the measurement bandwidth, over N number of resource blocks from all sources, including co-channel serving and non-serving cells, adjacent channel interference, thermal noise etc. For cell selection the measurement time resources(s) for NR Carrier RSSI are not constrained. Otherwise, the measurement time resource(s) for NR Carrier RSSI are confined within SS/PBCH Block Measurement Time Configuration (SMTC) window duration.

TABLE 2

| OFDM signal indication endSymbol | Symbol indexes |
|---|---|
| 0 | {0, 1} |
| 1 | {0, 1, 2, . . . , 10, 11} |
| 2 | {0, 1, 2, . . . , 5} |
| 3 | {0, 1, 2, . . . , 7} |

If indicated by higher-layers, if measurement gap is not used, the NR Carrier RSSI is measured in slots within the SMTC window duration that are indicated by the higher layer parameter measurementSlots and in OFDM symbols given by Table 2 and, if measurement gap is used, the NR Carrier RSSI is measured in slots within the SMTC window duration that are indicated by the higher layer parameter measurementSlots and in OFDM symbols given by Table 2 that are overlapped with the measurement gap.

For intra-frequency measurements, NR Carrier RSSI is measured with timing reference corresponding to the serving cell in the frequency layer For inter-frequency measurements, NR Carrier RSSI is measured with timing reference corresponding to any cell in the target frequency layer Otherwise not indicated by higher-layers, if measurement gap is not used, NR Carrier RSSI is measured from OFDM symbols within SMTC window duration and, if measurement gap is used, NR Carrier RSSI is measured from OFDM symbols corresponding to overlapped time span between SMTC window duration and the measurement gap.

If higher-layers indicate certain SS/PBCH blocks for performing SS-RSRQ measurements, then SS-RSRP is measured only from the indicated set of SS/PBCH block(s).

For frequency range 1, the reference point for the SS-RSRQ shall be the antenna connector of the UE. For frequency range 2, NR Carrier RSSI shall be measured based on the combined signal from antenna elements corresponding to a given receiver branch, where the combining for NR Carrier RSSI shall be the same as the one used for SS-RSRP measurements. For frequency range 1 and 2, if receiver diversity is in use by the UE, the reported SS-RSRQ value shall not be lower than the corresponding SS-RSRQ of any of the individual receiver branches.

<Disclosure of the Present Invention>

The present invention is related to measurement using different number of Rx beams for a serving cell and a neighboring cell.

Figure 5A:
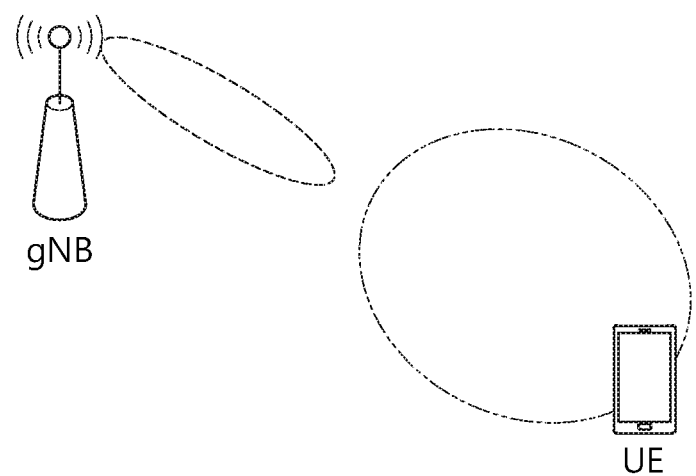
FIGS. 5A and 5B illustrates an example of Rx beam operation in FR 1 and FR 2.
Figure 5B:
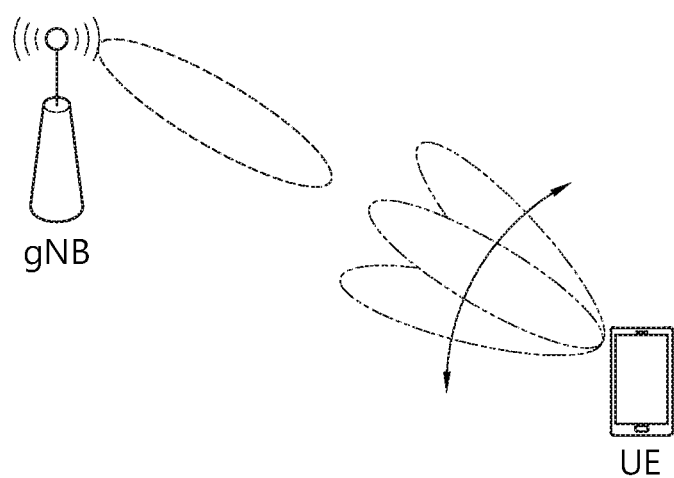

FIGS. 5A and 5B Illustrates an Example of Rx Beam Operation in FR 1 and FR 2.

Operating bands in NR are divided into FR 1 band and FR 2 band. Corresponding range of frequency is 410 MHz-7125 MHz for FR 1 and 24250 MHz-52600 MHz for FR 2. The UE uses an omni-directional antenna for FR 1 and uses a plurality of antennas based on Rx beamforming operation for FR 2. N is a number of Rx beam used for FR 2. In FR 2, beamforming operation of the UE's Rx beams is basically assumed to be used.

A user equipment (hereinafter, UE) for NR supports analog beamforming. The UE uses a plurality of Rx beams for performing measurement. If a number of Rx beams increases, more power is used for the measurement. Currently, the UE uses the same number of Rx beams for measurement related to a serving cell and measurement related to a neighboring cell. For saving power, it is needed to use different number of Rx beams for the serving cell and the neighboring cell.

Figure 6:
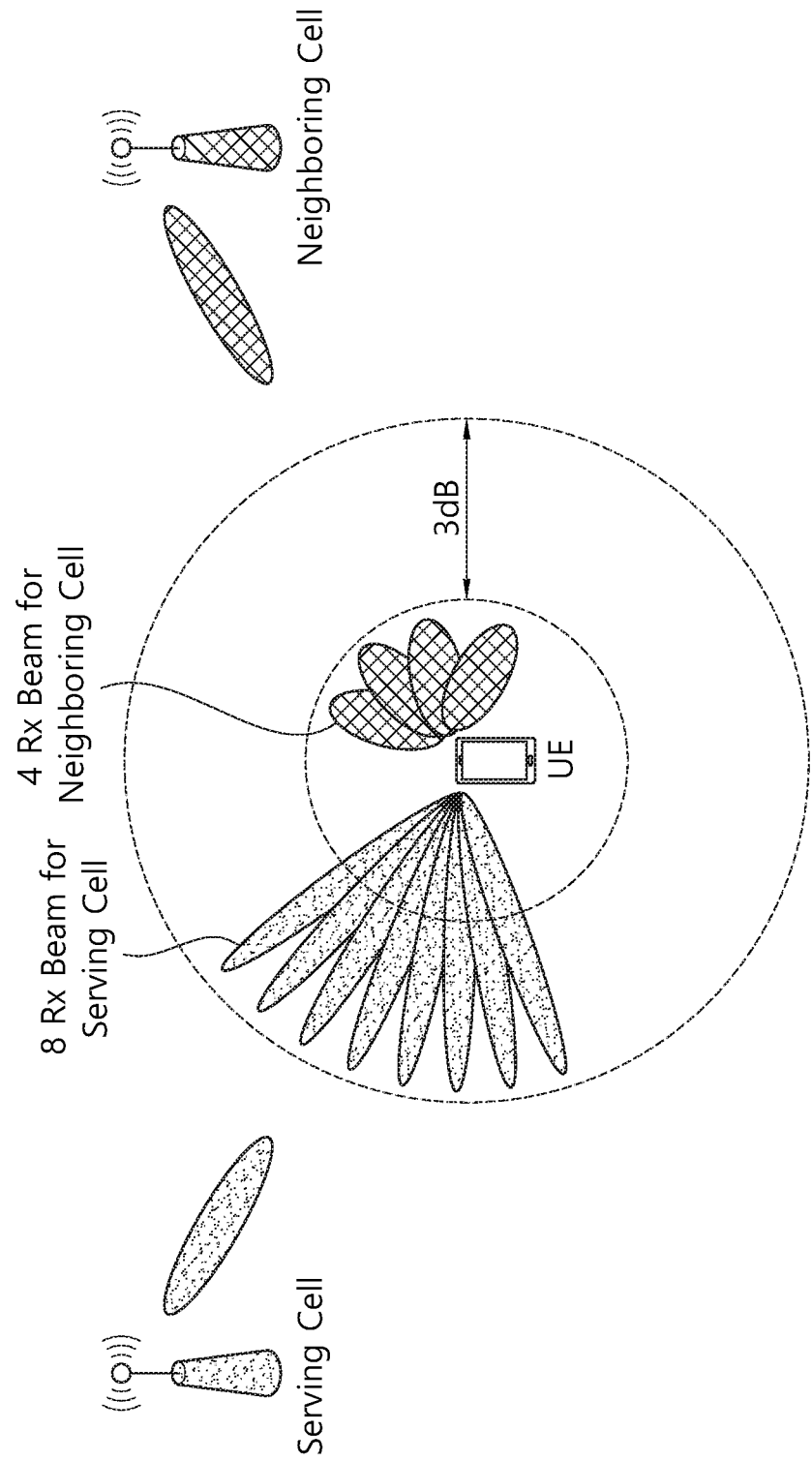
FIG. 6 illustrates an example of using different number of Rx beams for a serving cell and a neighboring cell.

FIG. 6 Illustrates an Example of Using Different Number of Rx Beams for a Serving Cell and a Neighboring Cell.

For serving cell and neighboring cell, different Rx beam number on SSB(Synchronous Signal Block) based measurement can be used by the UE in order to saving power. For example, the UE can use smaller Rx beam number for neighboring than a number of Rx beams for serving cell. Like the example illustrated in FIG. 6, the UE can use 8 Rx beams for serving cell and 4 Rx beams for neighboring cell. The different Rx beam results in different Rx antenna gain. According to definition of SSB based RSRP, SS-RSRP includes Rx antenna gain through combining antenna elements. It means that SS-RSRP for serving cell and neighboring cell can be different based on the different number of Rx beams even though same side condition (SNR). It can make ambiguity for Network (for example, serving cell) to decide which cell has bigger SS-RSRP when changing cell. FIG. 6 shows the example of 3 dB difference between an antenna gain for 8 Rx beam number and an antenna gain for 4 Rx beam number.

If assuming 8 Rx beam number for neighboring cell and same side condition of SNR, the SS-RSRP for neighboring cell is same as SS-RSRP for serving cell. However, with 4 Rx beam number for neighbouring cell, UE reports 3 dB smaller SS-RSRP than serving cell.

As explained above, different number of Rx beams results in different Rx antenna gain. It means results of the measurement related to a serving cell and the measurement related to a neighboring cell can be different even though both measurements were performed in same condition (for example, SNR)).

It would make serious problem for Network side to decide cell change. To avoid the problem, compensation for the measurement result is needed.

Two examples for the compensation are provided. One example is to be compensated in UE side. Another example is to be compensated in Network (for example, serving cell) side.

For UE side compensation example, the UE performs a measurement for SSB transmitted from a serving cell by using a first number (for example, 8) of receiving beams. The UE performs a measurement for SSB transmitted from a neighboring cell by using a second number (for example, 4) of receiving beams. The UE reports results of the measurements to the serving cell.

All reported measurement results (for example, SS-RSRPs) can be referenced with number of Rx beam used for serving cell to align relative level with serving cell. For the example above, SS-RSRP of neighboring cell should be reported after compensating the measurements result based on a compensation value (for example, adding 3 dB to the measurements result for the neighboring cell).

For Network side compensation example, network needs to know information related to a compensation value. For example, the information may include information about the Rx beam number used in UE side for serving cell and neighboring cell respectively. It requires new signaling and seems more complex than the UE side compensation example According to above mentioned two examples, it is suggested that RAN4 should not limit UE implementation of beam management for RRM measurement and Power saving. Also, it is suggested that same RRM measurement requirement should be applied under same side condition regardless of different Rx beam number for serving cell and neighboring cell. Also, it is suggested that compensation should be considered for RRM measurement due to different Rx beam number for serving cell and neighboring cell.

The compensation value may be predetermined. For example, the compensation value is predetermined based on Rx beam number used for the serving cell and Rx beam number used for the neighboring cell.

The compensation value may be determined by the UE or by the Network side. For example, the compensation value is predetermined based on Rx beam number used for the serving cell and Rx beam number used for the neighboring cell.

An example of compensating is provided with Equation 1. The UE or the serving cell may compensate a measurement result (for example, SS-RSRP for the neighboring cell) for the neighboring cell based on Equation 1. The UE or the serving cell may compensate the measurement result related to the neighboring cell based on the measurement result related to the serving cell.

SS-RSRP_neighboring_cell_afterCompensation=measured_SS-RSRP_neighboring_cell*10*log 10(Rx_beam_number_forServingCell/Rx_beam_number_forNeighbouringCell)  [Equation 1]

SS-RSRP_neighboring_cell_afterCompensation is compensated SS-RSRP for the neighboring cell. measured_SS-RSRP_neighboring_cell is measured SS-RSRP for the neighboring cell. Rx_beam_number_forServingCell is a number of Rx beam used for the measurement related to the serving cell. Rx_beam_number_forNeighbouringCell is a number of Rx beam used for the measurement related to the neighboring cell. A ratio of the number of Rx beam used for the serving cell and the number of Rx beam used for the neighboring cell is used for compensation.

SS-RSRQ may be determined by the UE or by the serving cell based on the compensated SS-RSRP.

In addition, if the UE uses a different number of Rx beams for a measurement related to the serving cell and a measurement related to the neighboring cell respectively, and if the UE performs compensation, the UE may transmitting of a flag informing the compensation has been performed to the serving cell. A presence or absence of the flag can be helpful in terms of accurate mobility operation for the base station.

TABLE 3

| signaling bit | compensation value |
|---|---|
| 000 | 0 |
| 001 | 3 |
| 010 | 6 |
| 011 | 9 |
| 100 | Reserved |
| 101 | −3 |
| 110 | −6 |
| 111 | −9 |

According to Table 3, maximum 3 bits can be used corresponding to the compensation value (0, positive or negative). The UE may select a compensation value among a plurality of predetermined compensation value (for example, compensation values in Table 3) based on the Rx number for the serving cell and the Rx number for the neighboring cell. For example, when a difference between the Rx number for the serving cell and the Rx number for the neighboring cell is bigger, the size of the compensation value can be bigger.

Figure 7:
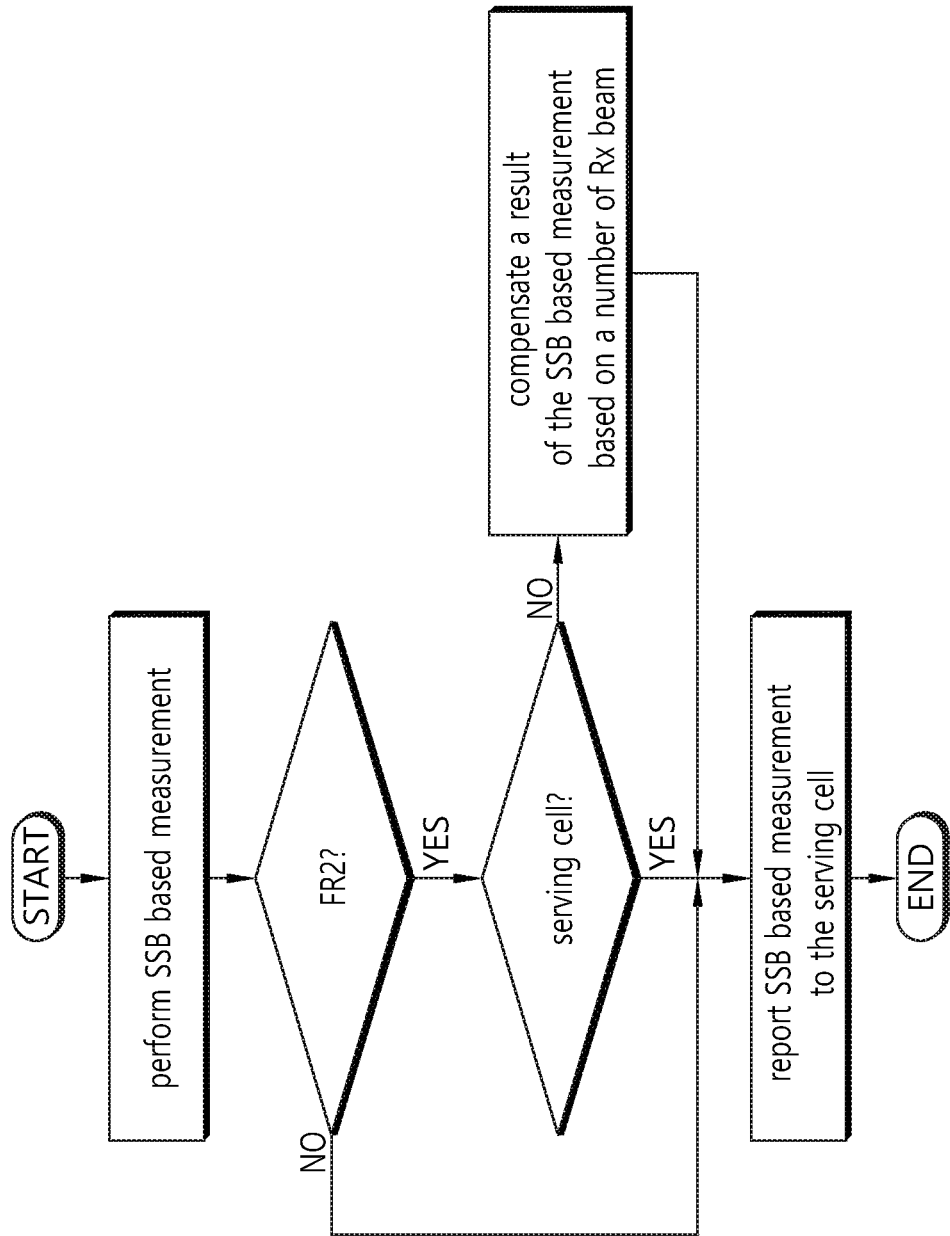
FIG. 7 illustrates a first example of an operation of UE.

FIG. 7 Illustrates a First Example of an Operation of UE.

The UE may perform measurement for SSB transmitted from a serving cell or a neighboring cell. That is, the UE may perform SSB based measurement.

If the UE has performed measurement not in FR 2, the UE may reports a result of the SSB based measurement to the serving cell.

If the UE has performed measurement in FR2 and the SSB measurement is related to the serving cell, the UE may reports a result of the SSB based measurement to the serving cell.

If the UE has performed measurement in FR2 and the SSB measurement is related to the neighboring cell, the UE may compensate a result of the SSB based measurement based on a number of Rx beam. For example, a number of Rx beam for the serving cell and a number of Rx beam for the neighboring cell are used for the compensation. After the compensation is performed, the UE may reports a compensated result of the SSB based measurement to the serving cell.

Figure 8:
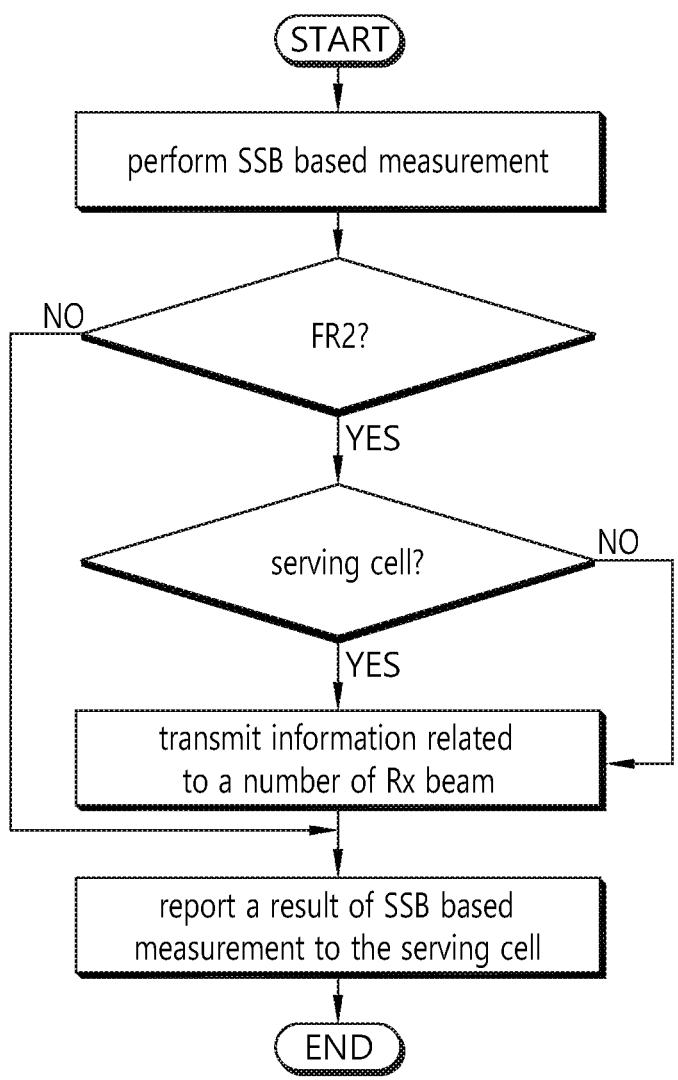
FIG. 8 illustrates a second example of an operation of UE.

FIG. 8 Illustrates a Second Example of an Operation of UE.

The UE may perform measurement for SSB transmitted from a serving cell or a neighboring cell. That is, the UE may perform SSB based measurement.

If the UE has performed measurement not in FR 2, the UE may reports a result of the SSB based measurement to the serving cell.

If the UE has performed measurement in FR2 and the SSB measurement is related to the serving cell, the UE may transmit information related to a number of Rx beam for the serving cell. Or the UE may transmit information related to a compensation value. After the transmission, the UE may reports a result of the SSB based measurement to the serving cell.

If the UE has performed measurement in $F^{R2}$ and the SSB measurement is related to the neighboring cell, the UE may transmit information related to a number of Rx beam for the neighboring cell. Or the UE may transmit information related to a compensation value. After the transmission, the UE may reports a result of the SSB based measurement to the serving cell.

Figure 9:
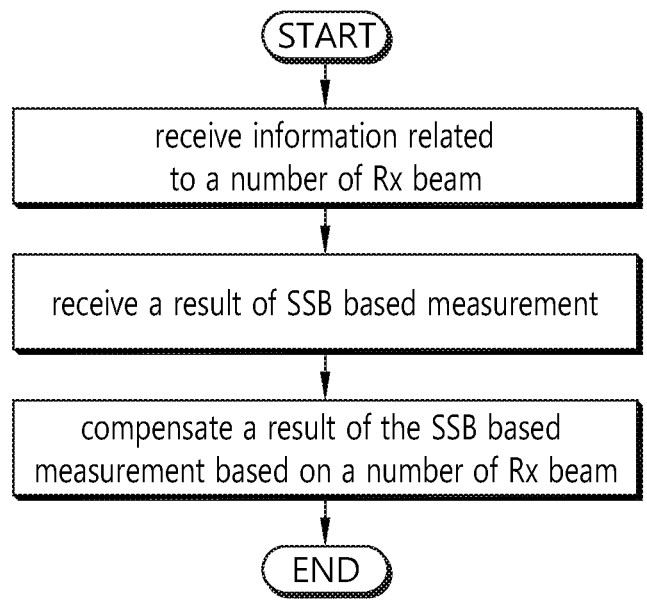
FIG. 9 illustrates an example of an operation of gNB.

FIG. 9 Illustrates an Example of an Operation of gNB.

The gNB (serving cell) may receive information related to a number of Rx beam from the UE. Or the serving cell may receive information related to a compensation value from the UE.

The serving cell may receive a result of SSB based measurement from the UE. The serving cell may receive a result of SSB based measurement related to the serving cell and a result of SSB based measurement related to the neighboring cell.

The serving cell may compensate the result of SSB based measurement based on the number of Rx beam or based on the information related to the compensation value. The serving cell may compensate the result of SSB based measurement related to the neighboring cell. For example, the compensation may be performed based on the Equation 1 or based on the Table 3.

Figure 10:
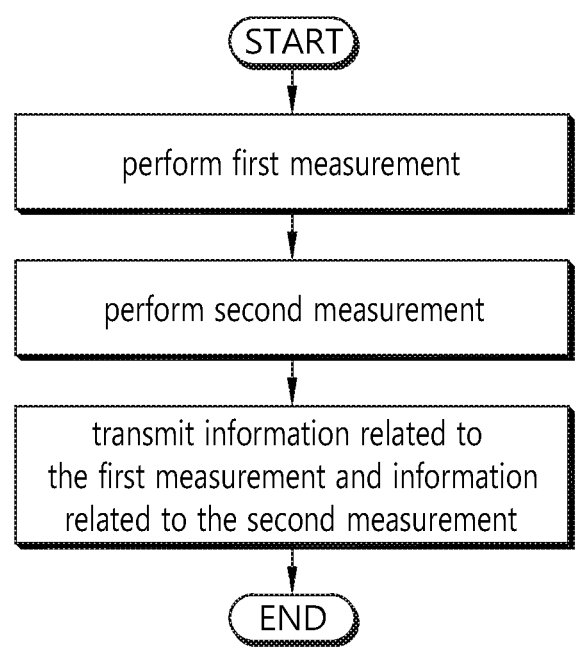
FIG. 10 illustrates an example of an operation of UE according to embodiments of the present invention.

FIG. 10 Illustrates an Example of an Operation of UE According to Embodiments of the Present Invention.

The UE may perform first measurement for a SSB transmitted from a serving cell by using a first number of receiving beams.

The UE may perform second measurement for a SSB transmitted from a neighboring cell by using a second number of receiving beams. The second number can be different from the first number. The UE may compensating a result of the second measurement based on a compensation value if the second number is different from the first number. The compensation value may be predetermined. Or the compensation value may be determined by the UE based on the first number and the second number.

The UE may transmit first information related to the first measurement and second information related to the second measurement to the serving cell. The second information includes the compensated result of the second measurement. The UE may transmit third information representing that the result of the second measurement is compensated.

The UE may transmit transmitting fourth information related to a compensation value. The fourth information may be used for compensating, performed by the serving cell, a result of the second measurement. The compensation value may be determined by the UE based on the first number and the second number. The compensation value may be selected among a plurality of predetermined compensation value (for example, the compensation values of Table 3) based on the first number and the second number.

According to the present invention, different RX beam set can be used in measurements on different measurement objects. It means it is up to UE implementation to use same RX beam set or different RX beam set for different measurement objects. It should be introduced in the related specification. For example, when UE uses different RX beam set for neighboring cell in different measurement object, measured/reported RSRP, RSRQ and SINR can be biased comparing with those of serving cell. As a result, it can be problematic in mobility. This case is not precluded before. Regarding that, we propose to introduce applicability of a set of UE RX beams as follows.

In order to clarify that different RX beam operations can be performed in the terminal, it is necessary to be described in the standard related to RRM as follows.

Proposal for the standard: Introduce applicability of a set of UE RX beams in FR2 as follows.

Applicability of a set of UE RX beams in FR2

It is up to UE implementation how to select a set of UE RX beams to perform RRM measurement on a carrier.

Different sets of UE RX beams can be used in measurements based on different measurement objects.

Figure 11:
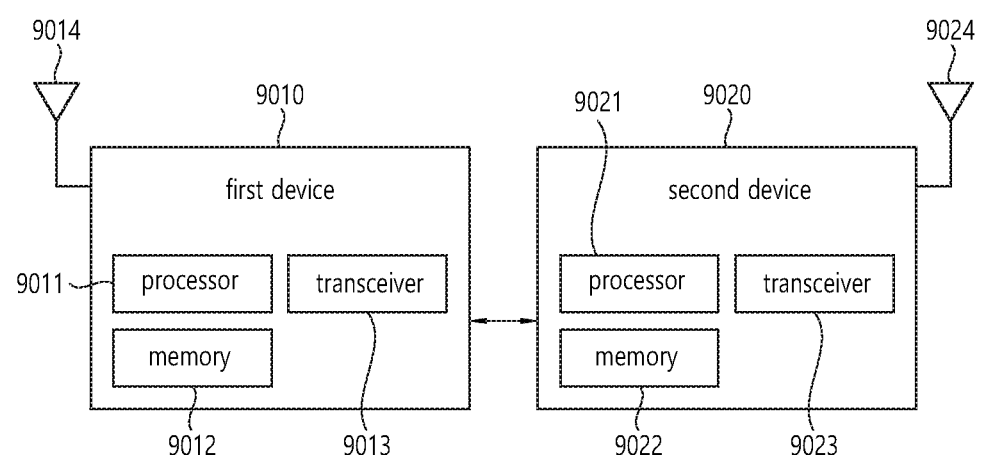
FIG. 11 illustrates a wireless communication device according to embodiments of the present invention.

FIG. 11 Illustrates a Wireless Communication Device According to Embodiments of the Present Invention.

FIG. 11 illustrates a wireless communication device according to an embodiment of the present invention.

Referring to FIG. 11, a wireless communication system may include a first device 9010 and a second device 9020.

The first device 9010 may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 9020 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. The processor 9011 may perform one or more layers of a radio interface protocol. The memory 9012 may be connected to the processor 9011 and store various types of information and/or commands. The transceiver 9013 may be connected to the processor 9011 and controlled to transmit/receive a radio signal.

The second device 9020 may include at least one processor, such as a processor 9021, at least one memory, such as a memory 9022, and at least one transceiver, such as a transceiver 9023. The processor 9021 may perform the functions, procedures, and/or methods described above. The processor 9021 may implement one or more protocols. For example, the processor 9021 may implement one or more layers of the radio interface protocol. The memory 9022 may be connected to the processor 9021 and store various types of information and/or commands. The transceiver 9023 may be connected to the processor 9021 and controlled to transmit/receive a radio signal.

The memory 9012 and/or the memory 9022 may be each connected inside or outside the processor 9011 and/or the processor 9021 and connected to other processors through various techniques such as wired or wireless connection.

The first device 9010 and/or the second device 9020 may have one or more antennas. For example, an antenna 9014 and/or an antenna 9024 may be configured to transmit and receive the radio signal.

Figure 12:
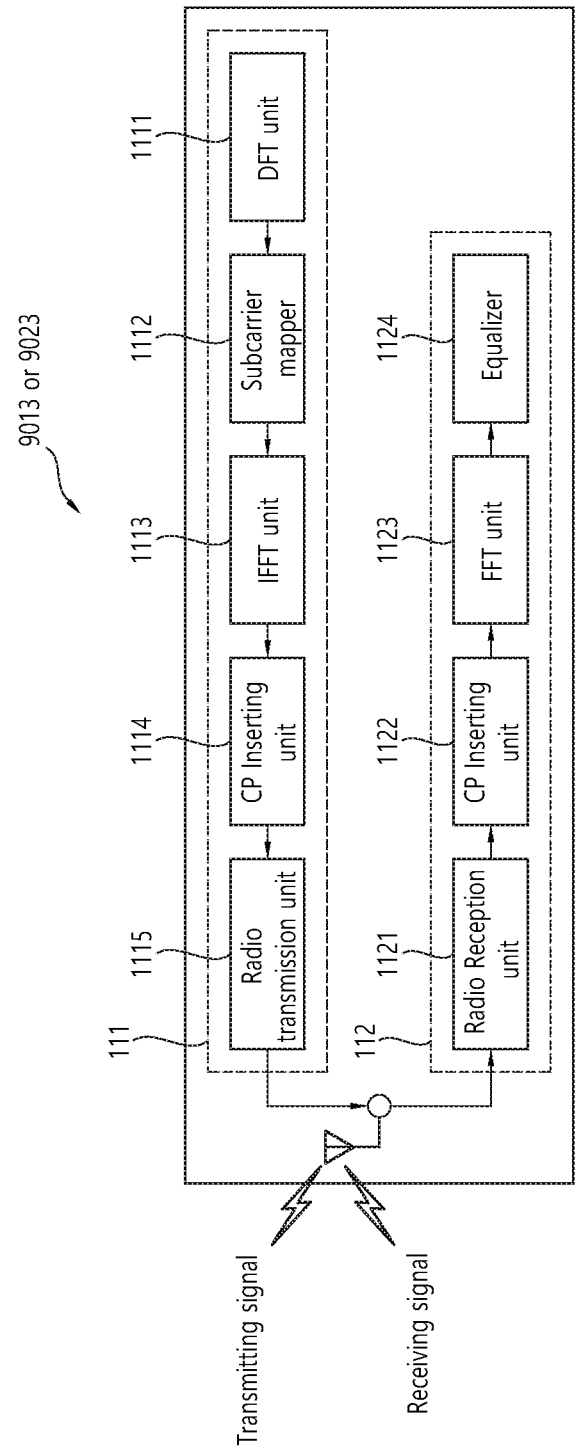
FIG. 12 is a detailed block diagram of a transceiver included in the wireless device shown in FIG. 11.

FIG. 12 is a Detailed Block Diagram of a Transceiver Included in the Wireless Device Shown in FIG. 11.

Referring to FIG. 12, the transceiver (9013 or 9023) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

Figure 13:
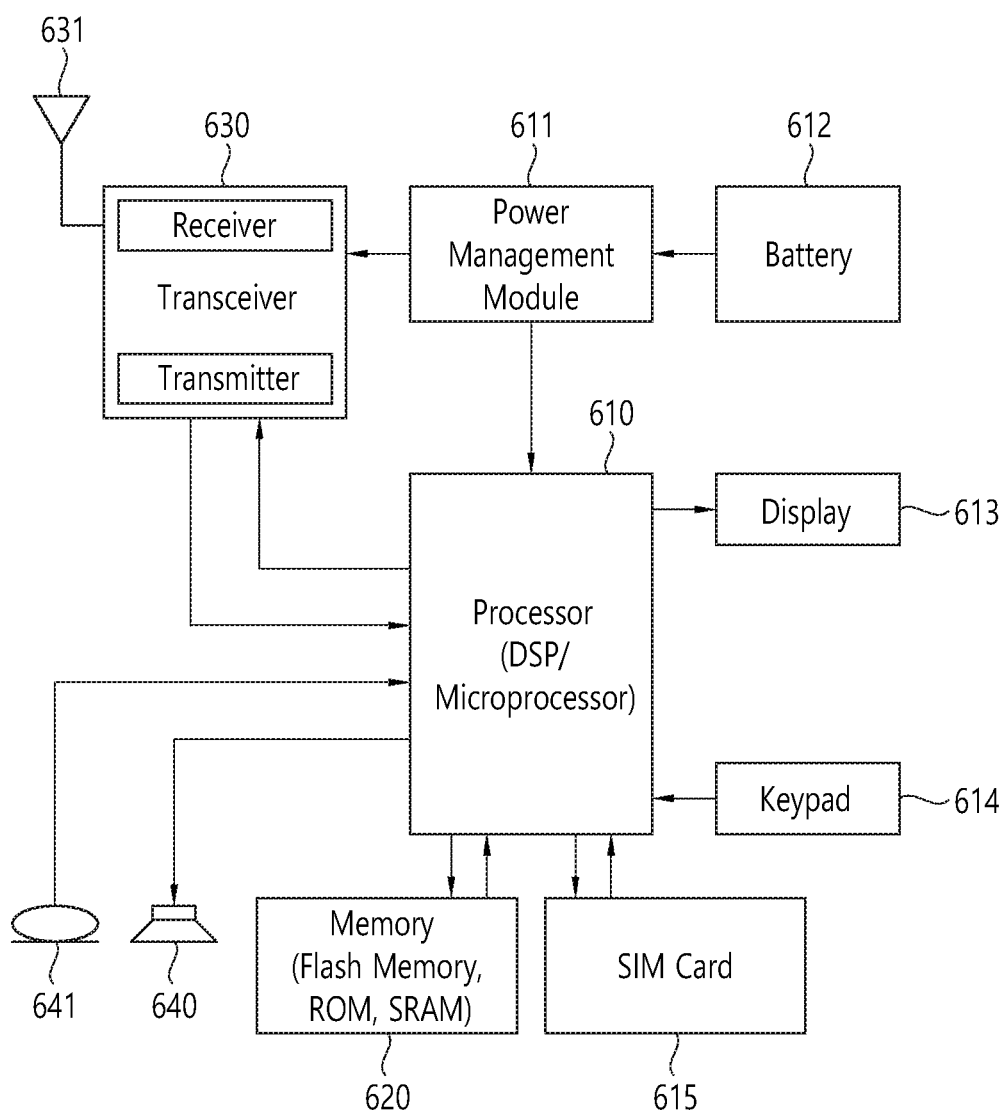
FIG. 13 illustrates a detailed example of the wireless communication device of FIG. 11.

FIG. 13 Illustrates a Detailed Structure of the Wireless Communication Device of FIG. 11.

FIG. 13 shows more detailed wireless communication device to implement an embodiment of the present invention. The present invention described above for UE side or network node side may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641. The processor 610 corresponds to the processor 9011 or the processor 9021. The memory 620 corresponds to the memory 9012 or the memory 9022. The transceiver 630 corresponds to the transceiver 9013 or the transceiver 9023.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to determine transmission power; and control the transceiver 630 to transmit uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 13, the spherical coverage is considered for the requirement for the EIRP value and the loss term, such as actual display (for example, LCD) and external cover of a UE, are reflected to the requirement.

<Artificial Intelligence (AI)>

Artificial Intelligence (AI) refers to AI itself or the field for studying how to build AI, and machine learning refers to the field for defining problems related to AI and studying how to tackle the problems. Machine learning is also defined as an algorithm that constantly performs a specific task to improve performance related to the task.

An Artificial Neural Network (ANN) is a model used in machine learning and may refer to entire models consisting of artificial neurons (nodes) forming a network through combination of synapses to solve problems. The ANN may be defined by a connection pattern between neurons on different layers, a learning procedure for updating a model parameter, and an activation function for generating an output value.

The ANN may include an input layer, an output layer, and selectively one or more hidden layers. Each layer may include one or more neurons, and the ANN may include a synapse connecting one neuron to another neuron. In the ANN, each neuron is able to output a value of an activation function with respect to input signals input through a synapse, weight, and bias.

A model parameter refers to a parameter to be decided through learning, and the model parameter includes a weight of synapse connection, bias in a neuron, etc. In addition, a hyperparameter refers to a parameter to be set in a machine learning algorithm before a learning process begins, and the hyperparameter includes a learning rate, the number of repetition, a mini-batch size, an initialization function, etc.

The purpose of training an ANN is to determine a model that minimizes a loss function. The loss function may be used as an indicator for determining an optimum model parameter in the process of training the ANN.

Machine learning may be classified into supervised learning, unsupervised learning, and reinforcement learning by types of learning.

The supervised learning may refer to a method for training an ANN with a given label for training data, and a label may refer to an answer (or a result) that an ANN needs to infer when training data is input to the ANN. The unsupervised learning may refer to a method for training an ANN without a given label for training data. The reinforcement learning may refer to a learning method for performing training an agent defined in a certain environment to select an action or action sequence that maximizes accumulative compensation.

Machine learning implemented as a Depp Neural Network (DNN) including a plurality of hidden layers among ANNs may be referred to as deep learning, and deep learning is part of machine learning. Hereinafter, machine learning is used to include deep learning.

Figure 14:
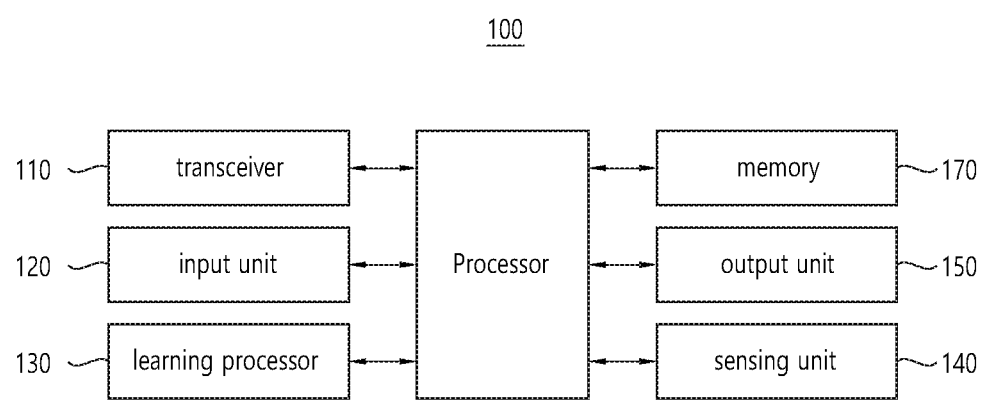
FIG. 14 illustrates an AI device 100 according to an embodiment of the present invention.

FIG. 14 Illustrates an AI Device 100 According to an Embodiment of the Present Invention.

The AI device 100 may be a fixed device or a mobile device, such as a TV, a projector, a mobile phone, a smart phone, a desktop, a laptop, a digital broadcasting terminal, a Personal Digital Assistant (PDA), a portable multimedia player (PMP), a navigation device, a tablet PC, a wearable device, a Set Top Box (STB), a DMB receiver, a radio, a washing machine, a refrigerator, a digital signage, a robot, a vehicle, etc. The AI device (100) may correspond to the UE of the present invention or the serving cell of the present invention.

Referring to FIG. 14, a terminal 100 may include a transceiver 110, an input unit 120, a learning processor 130, a sensing unit 140, an output unit 150, a memory 170, and a processor 180.

The transceiver 110 may transmit and receive data with external devices such as other AI devices or an AI server by using a wired or wireless communication technology. For example, the transceiver 110 may transmit and receive sensor information, a user input, a trained model, a control signal, and the like with the external devices.

In this case, the communication technology used by the transceiver 110 may be Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), or the like.

The input unit 120 may acquire various kinds of data.

In this case, the input unit 120 may include a camera to input an image signal, a microphone to receive an audio signal, a user input unit to receive information from a user, and the like. Here, the camera or the microphone may be considered as a sensor, and a signal acquired from the camera or the microphone may be called sensing data or sensor information.

The input unit 120 may acquire input data, which is to be used to acquire an output, by using training data for training a model and a trained model. The input unit 120 may acquire unprocessed input data, and, in this case, the processor 180 or the learning processor 130 may extract an input feature from the input data by performing pre-processing.

The learning processor 130 may train a model, which is configured as an ANN, using training data. Here, a trained ANN may be referred to as a trained model. The trained model may be used to infer a result value from new input data, not from the training data, and the inferred value may be used as the basis of determining a certain operation.

In this case, the learning processor 130 may perform AI processing together with a learning processor of the AI server.

In this case, the learning processor 130 may include a memory integrated into or implemented in the AI device 100. Alternatively, the learning processor 130 may be implemented using the memory 170, an external memory coupled directly to the AI device 100, or a memory used in an external device.

Using various sensors, the sensing unit 140 may acquire at least one of internal information of the AI device 100, surrounding environment information of the AI device 100, or user information.

In this case, the sensors included in the sensor 140 may be a proximity sensor, an illumination sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a radar, a lidar, etc.

The output unit 150 may generate an output relating to visible sense, auditory sense, or tactile sense.

In this case, the output unit 150 may include a display unit for outputting visual information, a speaker for outputting auditory information, a haptic module for outputting tactile information, etc.

The memory 170 may store data that supports various functions of the AI device 100. For example, the memory 170 may store input data acquired by the input unit 120, training data, a trained model, a learning history, etc.

The processor 180 may determine at least one executable operation of the AI device 100 based on information that is decided or generated using a data analytic algorithm or a machine learning algorithm. In addition, the processor 180 may perform an operation that is determined by controlling elements of the AI device 100.

To this end, the processor 180 may request, search, receive, or utilize data from the learning processor 130 or the memory 170, and control the elements of the AI device 100 to execute a predicted operation among the at least one executable operation or execute an operation determined to be preferable.

In this case, when interaction with an external device is required to perform the determined operation, the processor 180 may generate a control signal for controlling the external device, and transmit the generated control signal to the external device.

The processor 180 may acquire intent information regarding a user input, and decide a user's demand based on the intent information.

In this case, using at least one of a Speech To Text (STT) engine for converting a voice input into a character string or a Natural Language Processing (NLP) engine for acquiring intent information of a natural language, the processor 180 may acquire intent information corresponding to a user input.

In this case, at least one of the STT engine or the NLP engine may be partially composed of an ANN that is trained by a machine learning algorithm. In addition, at least one of the STT engine or the NLP engine may be trained by the learning processor 130, by the learning processor of the AI server, or distributed processing thereof.

The processor 180 may collect history information including details of an operation of the AI device 100 or a user's feedback on the operation, and store the collected history information in the memory 170 or the learning processor 130 or transmit the collected history information to an external device such as the AI server. The collected history information may be used to update a trained model.

In order to execute an application program stored in the memory, the processor 180 may control at least some elements of the AI device 100. Furthermore, in order to execute the application program, the processor 180 may operate a combination of two or more elements included in the AI device 100. The processor (180) may perform operations of the UE of the present invention or operations of the serving cell of the present invention.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing measurement, the method performed by a wireless communication device and comprising:

performing first measurement for a SS(Synchronization Signal)/PBCH(Physical Broadcast Channel) Block (SSB) transmitted from a serving cell by using a first number of receiving beams of the wireless communication device;

performing second measurement for a SSB transmitted from a neighboring cell by using a second number of receiving beams of the wireless communication device; and transmitting first information related to the first measurement and second information related to the second measurement to the serving cell, wherein the second number is different from the first number, and wherein the first number of receiving beams and the second number of receiving beams are generated by beamforming operation of the wireless communication device.

2. The method of claim 1, further comprising:
compensating a result of the second measurement based on a compensation value.

3. The method of claim 2,
wherein the compensation value is determined based on the first number and the second number.

4. The method of claim 2,
wherein the second information includes the compensated result of the second measurement.

5. The method of claim 2, further comprising:
transmitting, by the wireless communication device, third information representing that the result of the second measurement is compensated to the serving cell.

6. The method of claim 1, further comprising:
transmitting fourth information related to a compensation value,
wherein the second information includes a result of the second measurement, and
wherein the fourth information is used for compensating, performed by the serving cell, a result of the second measurement.

7. The method of claim 6,
wherein the compensation value is determined based on the first number and the second number.

8. The method of claim 6,
wherein the compensation value is selected among a plurality of predetermined compensation value based on the first number and the second number.

9. A wireless communication device for performing measurement, the wireless communication device comprising:
a transceiver; and
a processor operatively coupled to the transceiver, the processor is configured to:
perform first measurement for a SS(Synchronization Signal)/PBCH(Physical Broadcast Channel) Block (SSB) transmitted from a serving cell by using a first number of receiving beams of the wireless communication device;
perform second measurement for a SSB transmitted from a neighboring cell by using a second number of receiving beams of the wireless communication device; and
control the transceiver to transmit first information related to the first measurement and second information related to the second measurement to the serving cell,
wherein the second number is different from the first number, and
wherein the first number of receiving beams and the second number of receiving beams are generated by beamforming operation of the wireless communication device.

10. The wireless communication device of claim 9, wherein the processor is further configured to:
compensate a result of the second measurement based on a compensation value.

11. The wireless communication device of claim 10,
wherein the compensation value is determined based on the first number and the second number.

12. The wireless communication device of claim 10,
wherein the second information related to the second measurement includes the compensated result of the second measurement.

13. The wireless communication device of claim 10, wherein the processor is further configured to:
control the transceiver of the wireless communication device to transmit third information representing that the result of the second measurement is compensated to the serving cell.

14. The wireless communication device of claim 9, wherein the processor is further configured to:
control the transceiver to transmit fourth information related to a compensation value,
wherein the second information includes a result of the second measurement, and
wherein the fourth information is used for compensating, performed by the serving cell, a result of the second measurement.

15. The wireless communication device of claim 14,
wherein the compensation value is determined based on the first number and the second number.

16. The wireless communication device of claim 14,
wherein the compensation value is selected among a plurality of predetermined compensation value based on the first number and the second number.

17. The wireless communication device of claim 9,
wherein the wireless communication device performs communication with at least one of a mobile terminal, a network and an autonomous vehicle, which is different from the wireless communication device.

18. A processor for a wireless communication device in a wireless communication system,
wherein the processor is configured to control the wireless device to:
perform first measurement for a SS(Synchronization Signal)/PBCH(Physical Broadcast Channel) Block (SSB) transmitted from a serving cell by using a first number of receiving beams of the wireless communication device;
perform second measurement for a SSB transmitted from a neighboring cell by using a second number of receiving beams of the wireless communication device; and
transmit first information related to the first measurement and second information related to the second measurement to the serving cell,
wherein the second number is different from the first number, and
wherein the first number of receiving beams and the second number of receiving beams are generated by beamforming operation of the wireless communication device.

* * * * *